United States Patent [19]

Hopkins

[11] Patent Number: 4,969,707
[45] Date of Patent: Nov. 13, 1990

[54] FIBER OPTICS VIEWING DEVICE

[76] Inventor: Ralph C. Hopkins, 1131 Runnymede Dr., San Jose, Calif. 95117

[21] Appl. No.: 64,904

[22] Filed: Jun. 19, 1987

[51] Int. Cl.$^5$ ............................................. G02B 6/06
[52] U.S. Cl. .............................. 350/96.25; 350/96.24
[58] Field of Search ................ 350/96.24, 96.25, 96.26

[56] References Cited
U.S. PATENT DOCUMENTS

| | | | |
|---|---|---|---|
| 3,985,424 | 10/1976 | Steinacher | 350/96.25 |
| 4,116,739 | 9/1978 | Glenn | 350/96.25 X |
| 4,208,096 | 6/1980 | Glenn, Jr. | 350/96.25 |
| 4,375,315 | 3/1983 | Lacombat et al. | 350/96.25 |
| 4,577,926 | 3/1986 | Dewey et al. | 350/96.25 |
| 4,709,985 | 12/1987 | Takeuchi | 350/96.25 |

FOREIGN PATENT DOCUMENTS 2931368  2/1981  Fed. Rep. of Germany ... 350/96.26

Primary Examiner—John D. Lee
Assistant Examiner—Phan T. Heartney
Attorney, Agent, or Firm—Paul B. Fihe

[57] ABSTRACT

A high quality fiber optic viewing device is provided which includes a fiber optic bundle having two ends, each end being cut in a plane perpendicular to the longitudinal axes of the optical fibers and highly polished. At the input end of the device a lens system presents a wide angle view to the bundle. The output end is able to be viewed directly or by a television camera. The device is particularly suited for use in moving vehicles, security systems and inspection of dangerous or hard to reach objects.

25 Claims, 3 Drawing Sheets

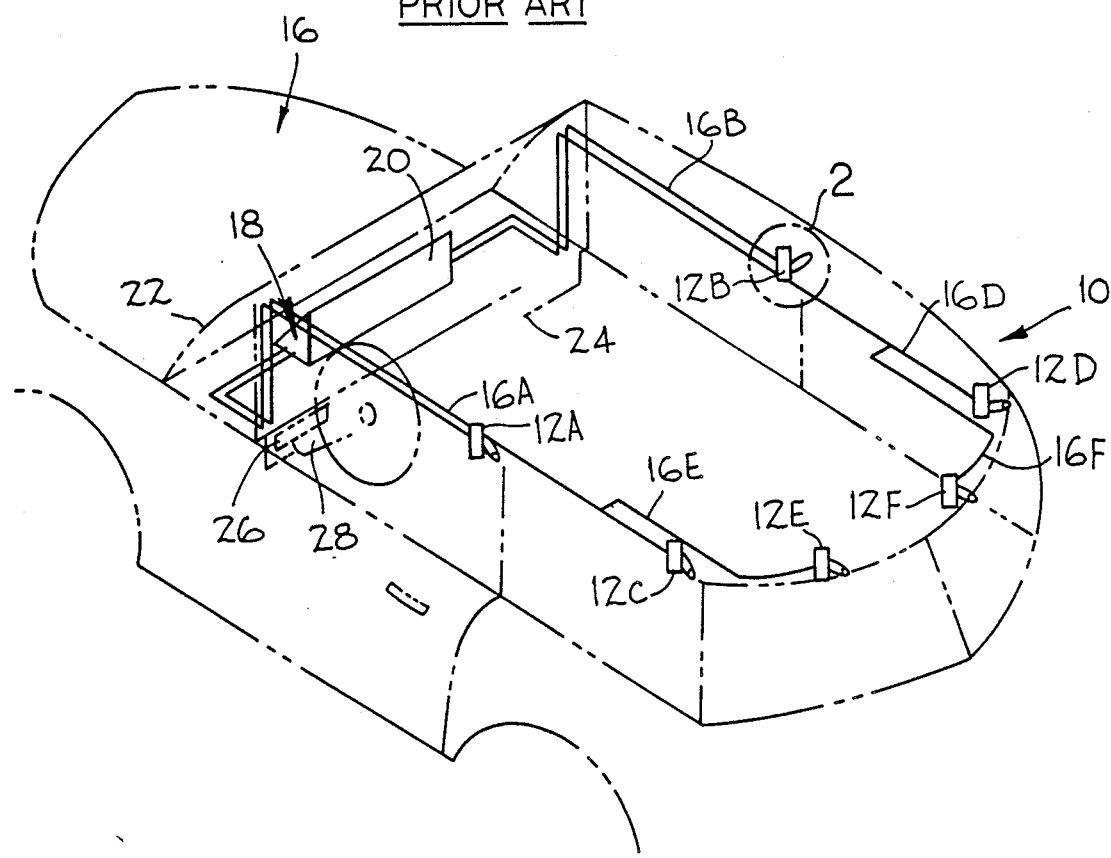
Fig_1
PRIOR ART
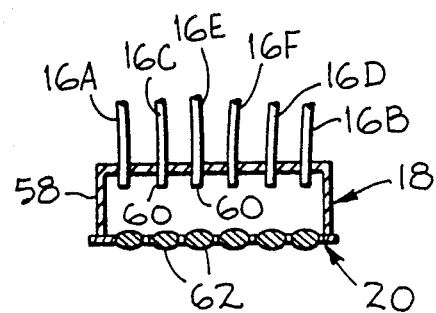
Fig_2
PRIOR ART

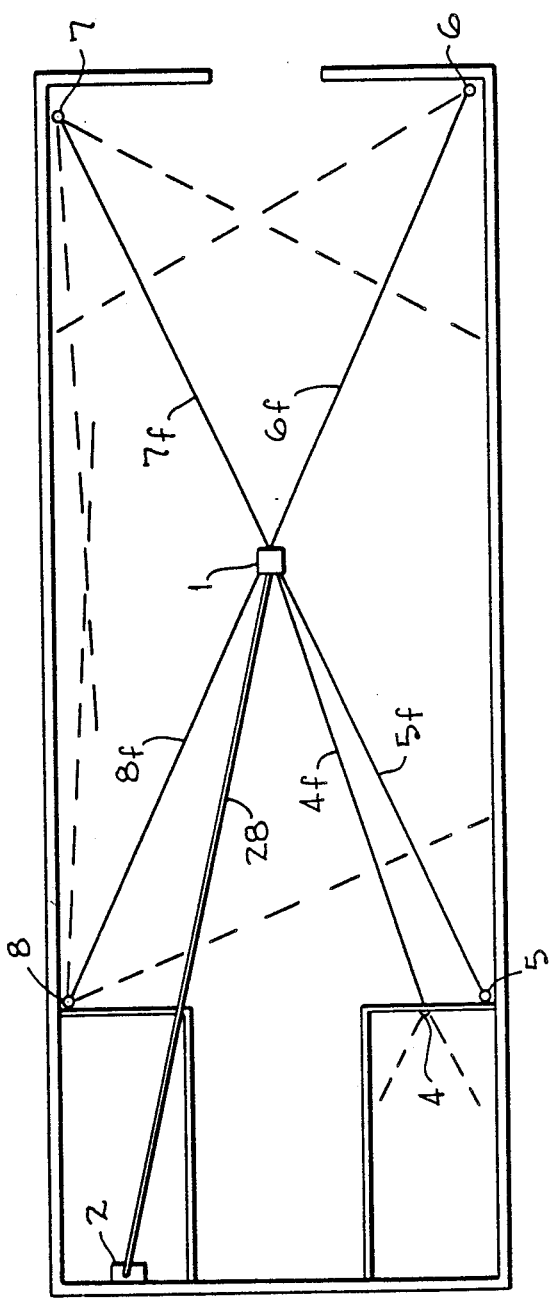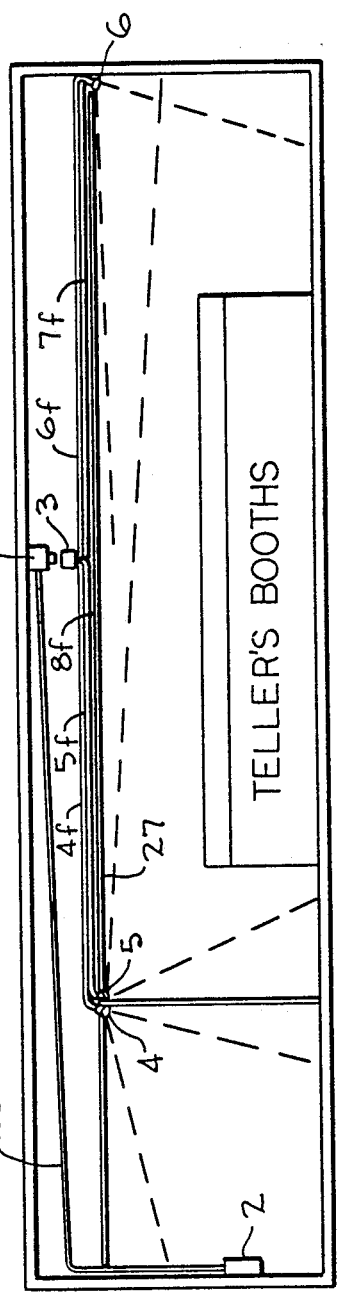

FIBER OPTICS VIEWING DEVICE

BACKGROUND OF THE INVENTION

This invention relates to fiber optics and more particularly to fiber optic bundles with a lens system at one end and polished surfaces at the other end.

Fiber optic bundles can be manufactured to have the property that light impinging onto one end of a bundle is transmitted through the bundle, including along curved paths, without distortion so that the image is presented undistorted at the opposite end of the bundle.

In prior art fiber optic devices, lenses and magnifying devices were sometimes provided in order to reduce the number of fibers used in a device. U.S. Pat. No. 3,985,424 to Steinacher shows a panoramic rear viewing system in which multiple fiber optic bundles are mounted behind lenses at various positions around the periphery of a vehicle. The output ends of the fiber optic bundles are located side by side behind an array of magnifying lenses within view of the driver for combining the sector images into a panoramic view. Steinacher's device requires a lens at each end of each fiber optic bundle. The magnifying lenses at the output ends of the fiber optic bundles allow the fiber optic bundles to serve a viewing area larger than the combined area of the fiber optic bundles. If the magnification is considerable at the viewing end, the quality of the image will be degraded due to the finite size of the fibers in the bundle. Additionally, in order to achieve a panoramic view, the orientation of the output ends must be carefully coordinated with the orientation of the input ends and the multiple input ends must be coordinated with each other. A simpler, less expensive, and more versatile device is desired.

SUMMARY

In accordance with this invention a fiber optics device is provided having wide application for such uses as replacing rear and side view mirrors in an automobile, providing side, rear and downward vision in other vehicles, providing remote viewing for a bank or other security system, providing remote viewing for power transmission lines, and providing remote viewing in inaccessible places such as in a nuclear power plant, a poisonous chemical plant, or a clean room in which human presence is harmful.

The device of this invention provides a lens system of conventional optics similar to that used in a camera to focus an image onto film. Instead of focusing the image onto film, however, the lens system focuses the image onto an input end of a fiber optic bundle. The fiber optic bundle is highly polished at both ends, with each set of polished ends forming a plane perpendicular to the length of the bundle. Light presented to the input end of the bundle by the lens system is carried to a viewing end where a person can directly view, in the polished ends of the fibers, the image presented to the input end. No second system of lenses at the viewing end is necessary. No loss of resolution at the viewing or output end occurs due to graininess when the image is magnified at the output end. Distortion of the image is as low as that in the picture provided by a camera since the lens system is equivalent to that of a camera. Additionally, there is no need to carefully orient the output end of the fiber optic bundle with respect to any lens.

When used to provide rear and side vision in an automobile, the device of this invention can be more economical than a typical system of side view mirrors in which remote adjustment is provided. The image is also superior to that of a typical set of rear and side view mirrors because the input ends can be located at a rear corner or other rear location of the vehicle, depending on the view desired. No break in the field of vision occurs from obstacles presented to a rear view mirror such as parts of the vehicle located between the rear view mirror and the region to be viewed. A preferred embodiment for an automobile uses two fiber-optic bundles having their output ends located side by side on the dashboard of the car and their input ends with viewing lenses located near upper rear corners of the vehicle The lens systems are pointed outward and somewhat downward so that both fields of view include the direction to the rear of the vehicle and each field of view includes its respective side of the vehicle. The downward orientation of the lens prevents mist and raindrops forming or collecting on the surface of the lens and thus achieves a clear image even in poor weather. Two lens systems each with a 90-degree field of vision provide coverage of close to the full 180-degree rear view of the vehicle. Unlike a curved mirror which provides a wide angle of vision but distorts the depth perception, the lens system of this invention provides so little distortion that any distortion is not noticed by the human eye. Also, the field of view does not change as a driver's head changes position, so the rear viewing system does not have to be adjusted for different drivers. The output ends can be located so that the eyes of a driver must turn only slightly from viewing the road ahead to viewing the fiber optic bundles presenting the rear view. More importantly, the output ends are, in one embodiment, placed in the dash, thereby not to block part of the windshield as does a rearview mirror. The output ends take up only a small area, smaller than that of a conventional rear view mirror, and yet present a clearly visible image of the full rear of the vehicle. Orientation of the left and right input ends (the lens ends) can be adjusted independently of each other. The two viewing areas (the output ends) are looked at independently by the driver so their orientation with respect to each other is not critical.

Further embodiments provide a similar system for use in aircraft in which a view of not only the rear but also above and below the aircraft can be provided. One embodiment locates two fiber optic bundles and lens systems so that they point toward corners at the rear of the airplane and thus cover the rear and sides of the airplane. Two more bundles are located on the top and bottom of the aircraft and are oriented to provide views above and below the aircraft respectively Similar applications can be made for ships and submarines. In a submarine a very inconspicuous periscope can be provided. In trucks, great improvement can of course be achieved by the device of this invention over the large and cumbersome mirrors typically used. Also in vehicles with large blind spots such as the passenger transport buses of the type used in the Dulles Airport near Washington, D.C., this invention provides a simplification, reduced cost, and increased reliability over the television camera systems typically used.

The system of this invention has further application in security systems such as are used in banks or some stores where it is desirable to monitor certain locations such as doors or vaults or dressing rooms or valuable objects. The input end with the lens attachment can be placed in an inconspicuous location, even behind a semi-transparent fabric or mirror so that it can not easily be detected and circumvented or blocked by a thief.

In another application, the system can be used in locations where humans can not go. For example, in nuclear power plants it is important for safety reasons to inspect certain locations such as welded joints. In the past, television cameras have been mounted along tracks and used to inspect pipes for cracks and the like. However television cameras cannot be used when the nuclear power plant is operating because the radiation distorts the television signal or damages the electronics. However, a fiber-optics cable can be used under conditions of fairly high radiation. Since there are no electronic parts at the input end, the fiber optic image is not significantly degraded due to the radiation.

Clean rooms, used for manufacturing electronic components and growing biological samples, for example, are preferably operated without the presence of humans. Yet it is important to inspect the operation within the clean room and it is important also that the inspecting device not generate particulate matter, thereby reducing the cleanliness of the room. A fiber optic viewing device has no moving parts and therefore does not add contaminants to the clean room. Therefore the device of this invention has particular application in a clean room.

BRIEF DESCRIPTION OF THE DRAWINGS

FIG. 1 shows a prior art panoramic rear viewing system for an automobile in which lens systems are used on both ends of a fiber optic bundle.

FIG. 2 shows the lens system at the viewing end of the prior art system of FIG. 1.

FIGS. 6a and 6b shows an embodiment of the invention used for security observation in a bank, warehouse or store.

DETAILED DESCRIPTION

Figure 3:
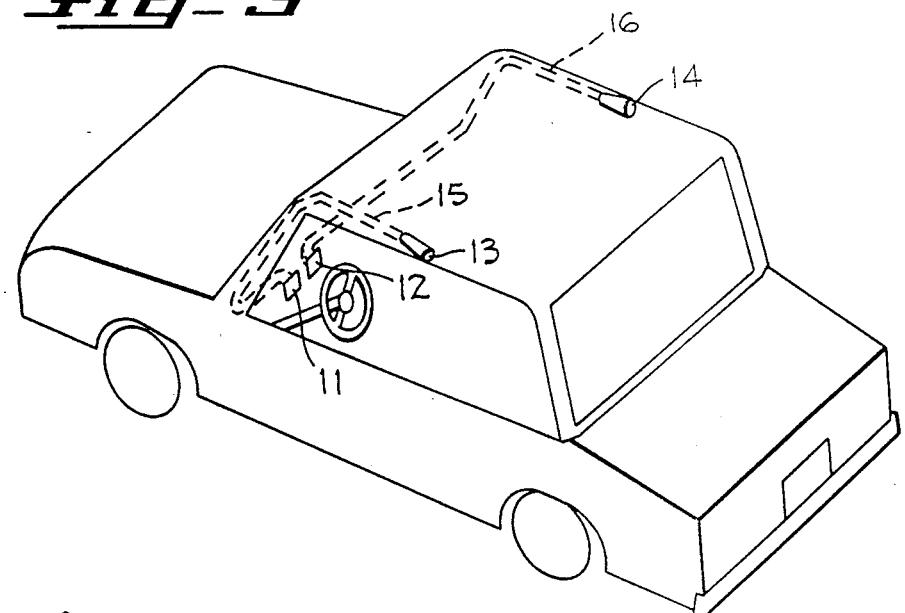
FIG. 3 shows one embodiment of the current invention useful for an automobile.
Figure 4:
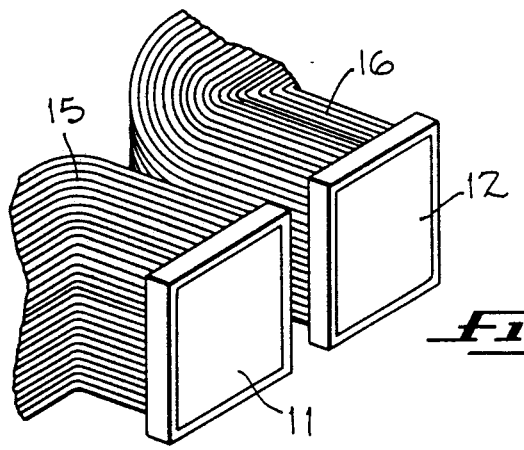
FIG. 4 shows a close-up view of the output end of the two fiber optic bundles shown in FIG. 3.

FIG. 3 shows a preferred embodiment of this invention for use in an automobile, truck, van or other surface vehicle. Fiber optic bundles 15 and 16 carry light from input ends 13 and 14 respectively to output ends 11 and 12 respectively. Input ends 13 and 14 are preferably located near the upper rear corners of the vehicle and oriented to point downward about 15 degrees and about 40 degrees away from the rear direction toward the sides on which they are located. Thus, to an observer standing behind the car and facing the back of the car, input end 13 points 40 degrees to the left of rear, and input end 14 points 40 degrees toward the right of rear. Both input ends 13 and 14 point about 15 degrees down from horizontal.

Figure 5:
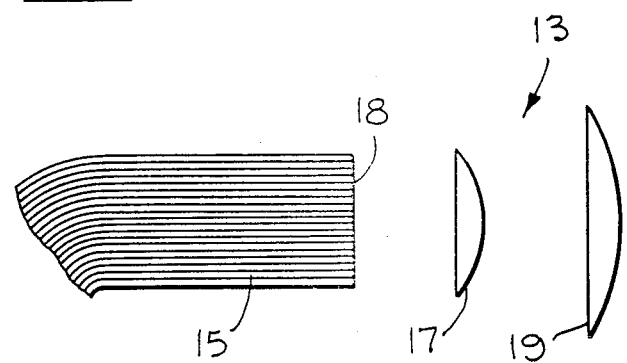
FIG. 5 shows a close-up view of the input end of one fiber optic bundle shown in FIG. 3.

As shown in FIG. 5, input end 13 comprises a lens system of two plano-convex lenses 17 and 19 having flat sides oriented toward the fiber optic bundle and curved sides oriented toward the area to be viewed. This is the arrangement found in 35 mm cameras and the like and such a lens system is of well-known design. Of course other lens arrangements can also be used depending on the particular application. The important feature of the invention is that a lens system is provided which produces an undistorted image in the place containing end 18 of fiber optic bundle 15. Preferable the lenses are arranged to present approximately a 90-degree field of view to end 18. The lenses are preferably spaced to focus on a distance of infinity. Therefore no adjustment of the lenses is required during operation. In order to have the lens system be of small physical size, a lens system having a focal length less than 1.6 inches from the farthest lens to the end 18 of the fiber optic bundle is chosen.

End 18 of fiber optic cable 15 is cut to form a plane perpendicular at the point of cutting to the lengthwise direction of the fiber optic cable, and is highly polished. This allows the fiber optic cable to transmit the image undistorted from the input end to the output end.

Output ends 11 and 12 are preferably located above the dash board of the car, to the right of the steering wheel. This location places the output ends in clear view of the driver while requiring minimal change of direction from viewing the road ahead. Output ends 11 and 12 are also cut to form a plane at right angles to the lengthwise direction of fiber optic cables 15 and 16 and are highly polished, and thus present to the driver a direct undistorted view of the image seen by the input end. If desired output ends 11 and 12 can be placed in the dash so as not to obstruct any part of the windshield.

Fiber optic bundles 15 and 16 are preferably buried in the frame of the car. For a sedan, truck, or van, they preferably run between the sheet metal of the roof and the interior ceiling of the vehicle and pass down along the roof supporting posts, beneath the dash board, and emerge at their viewing locations at the output ends of the bundles. One preferred embodiment uses fiber optic bundles having a square viewing end of 0.8 inches on a side. This compact size can produce a clear enough image that lettering 2½" to 3" high on the side of a truck can be read by a driver looking at the output end when the truck is a distance of about 100 feet from the vehicle in which the fiber optic device is located.

Fiber optics coherent strands for transmitting light have a cladding material which acts as a mirror and maintains the light within the cable. However, every reflection produces a loss of light intensity. Therefore, 30–35 feet is a typical maximum length for a fiber optic cable to maintain good light intensity. This distance is sufficient to allow for direct transmission from the rear of most vehicles directly to the viewing position near the driver.

The above description applies to a preferred fiber optic system for a surface vehicle such as a car, van, truck or the like. Systems useful in airplanes, submarines and railroad trains will now be described.

This invention is particularly useful in vehicles such as airplanes, submarines and railroad trains where the pilot, captain or engineer has difficulty seeing what is actually going on in other parts of the vehicle. Thus in an airplane a light may indicate that landing gear is not properly extended when in fact the malfunction is not in the landing gear but in the light on the instrument panel. Also cargo doors sometimes are indicated to be in one condition when they are actually in another condition. The scanning device of this invention allows the pilot, captain or engineer to survey the structure of the vehicle to determine the actual condition of the object indicated to malfunction. In a combat airplane the optical sensor of this invention allows the pilot to visually see his adversary approaching him from a blind spot. In a submarine the use of the optical scanning device of this invention on the surface of the submarine allows the detection of underwater mines and other obstacles. Use of this invention on a ship allows the operator to see how close the ship is to other objects such as docks or ships.

Figure 7:
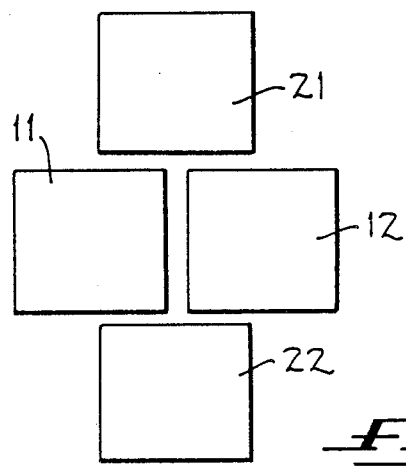
FIG. 7 shows an arrangement of output ends of four fiber optic bundles useful in an aircraft installation.

FIG. 7 shows a preferred arrangement of the output ends of the fiber optic bundles useful in an airplane. As in the embodiment of FIG. 3, the aircraft has rear viewing devices with their input ends 13 and 14 (aircraft embodiment not shown) at rear corners of the aircraft. Fiber optic bundles lead to output ends 11 and 12 (FIG. 7) which are near the pilot. Additionally, fiber optic devices having their input ends located on the top and bottom of the plane respectively have their output ends 21 and 22 mounted in the orientation shown in FIG. 7, so that the pilot may have a convenient view of these directions around the aircraft.

The fiber optic device of this invention is not restricted to use with moving vehicles, however.

For maintaining security in a warehouse covering many thousand square feet, a preferred embodiment of this invention shown in FIGS. 6a and 6b locates the input ends of a plurality of fiber optic bundles at strategic locations around the warehouse, preferably frequent and inconspicuous locations, and brings the viewing ends of fiber optic bundles to a single area where a television camera is located. This single television camera receives the images from the fiber optic cables and in turn transmits the multiple fiber optic images to a security center for viewing. In a large area where the installation requires locating lenses over a span greater than 60 to 70 feet, multiple fiber optic bundles are fed to television monitors at more than one location, and more than one television screen is located in the security center.

In one embodiment, a television camera picks up and relays the picture from the viewing ends of only one of the fiber optic bundles at a time, switching to successive bundles according to the need at the particular installation. Alternatively, a single television screen may transmit an array of images simultaneously. Simultaneous transmission of many images gives greater viewing expanse but causes lower resolution for each image. A preferred embodiment allows an operator to select between these modes so that when nothing suspicious is occurring an operator can view the entire array and when a suspicious event appears from one of the fiber optic bundles, the operator can switch the system so that the fiber optic bundle carrying the suspicious image is presented on the entire screen.

The main advantage of this embodiment of the invention lies in the fact that a plurality of fiber optic bundles are used to provide a corresponding plurality of images to a single television camera so that the corresponding plurality of images can be viewed simultaneously by a single operator.

The security system presented here in which the lens for viewing an area is attached to the input end of a fiber optic bundle rather than, conventionally, directly to a television camera has the advantage that no electrical power, electronics, or moving parts need be provided at the location of the lens. In a security application this allows the lens to be located in a very inconspicuous location. Also since multiple fiber optic bundles feed a single television monitor, the cost of the system is greatly reduced.

FIGS. 6a and 6b show the top and side views of the layout of a typical bank, warehouse, or store installation of a security system of this invention. Television camera 1 is mounted above a false ceiling near the center of the area to be monitored. Fiber optic bundles 4f, 5f, 6f, 7f, and 8f are also mounted above false ceiling 27 and carry light from lenses 4, 5, 6, 7, and 8 respectively to television camera 1. Television camera 1 in turn places an electrical signal representing images presented to it onto line 28 to be received by television viewing screen 2, located where it can be viewed by an operator responsible for security. Lenses 4, 5, 6, 7, and 8 are placed in inconspicuous locations with only their receiving ends opening into the room to be viewed. The lenses 4, 5, 6, 7 and 8 are each oriented to have a field of vision covering respective areas to be monitored. In the embodiment of FIGS. 6a and 6b, lens 4 monitors a separate room such as a bank vault or a dressing room. Only a single television camera and single television screen are needed to monitor the entire building shown, yet five separate locations are viewed.

The same principle of combining a plurality of views from the output ends of fiber optic bundles, viewing the output ends of the fiber optic bundles and displaying the resulting views on a television screen can of course be repeated multiple times in a large building so that a plurality of television screens in a security room can present multiple views of the entire large building or so that a single television screen can be switched from monitoring one plurality of views to monitoring another plurality of views.

Another use of the above system having a plurality of fiber optic devices feeding a single television camera is in railroad trains where a plurality of fiber optic viewing devices are mounted on each car of the train and feed a single television camera on that car. The multiple television cameras on the multiple cars feed television screens located within view of the train engineer or crew and allow the crew to monitor each car.

A further application in a submarine provides a periscope having a thin arm which can be raised to the surface of the water. On the upper end of this periscope are mounted a plurality, preferably four, of input ends of the fiber optic device. The fiber optic bundles extend downward through the arm and emerge at a viewing location. In one embodiment the output end of the bundle is oriented in a line with but opposite from the location of the input end, so that the person viewing the image sees it in the direction it comes from. Fiber optic devices can also be mounted at various locations on the surface of the submarine, and their images brought by television to a convenient location. The device of this invention when used as a periscope has the advantage that the periscope may be manufactured of non-metallic parts, and without using electronic components at the upper end of the periscope arm. It is therefore more difficult to detect by radar and more hardened to nuclear radiation.

The system of this invention has particular usefulness in a nuclear power plant. At the present time it is necessary to shut down each unit of a nuclear energy power generating station in order to inspect the container which houses the highly radioactive fuel rods. This inspection is done by a very complicated system of lowering a television camera into the pit for the purpose of viewing the condition of the welded joints and observing any other potential malfunction of the system. This process is very time consuming and can be hazardous to the workers involved. With the device of this invention, in which the fiber optic bundles are not affected by radioactive emission, the bundles can be located permanently in strategic positions around the periphery of the pit, enabling the operating personnel to have an ongoing check of the condition of the pit structure and weldments, without the necessity of shutting down the unit.

Still another use of the current invention applies to inspection of electrical power transmission lines which transmit extremely high voltages and span long distances between tower connections. Periodic failure of such electrical power transmission lines occurs as gusts of wind swaying the transmission cable eventually results in a fatigue failure. Much time and money is spent periodically inspecting the tower connections. Because inspection with high power field glasses is not acceptable to the Federal Power Commission, inspection usually involves expensive and complicated man-lift machinery to bring the inspector close to the highly vulnerable area surrounding each insulator connection. Using the current invention, the fiber optic system is mounted with at least one fiber optic cable running up a tower, the input ends and lenses oriented to include the critical regions in the field of view, and the output ends located near the base of the tower where they can be conveniently viewed. The time, cost, and risk of using man-lifting equipment is thus avoided.

One significant advantage of this invention is the substantial elimination of the reflection of head lights from rear view mirrors. Such reflections can temporarily blind a driver at night. Accordingly this invention improves driving safety.

The above description includes several embodiments of the current invention. Other embodiments will become obvious to those skilled in the art in light of the above disclosure and are intended to fall within the scope of the invention.

I claim:

1. A fiber optic viewing device comprising:
   at least one lens for focusing a field of view in only one direction therethrough into a parallel light path,
   a fiber optic bundle having an input end and an output end, each of said ends occupying a plane cut perpendicular to the direction of said fiber optic bundle and polished to have a smooth surface, all of said optical fibers being substantially parallel to one another throughout their lengths,
   said input end of said fiber optic bundle being oriented with respect to said at least one lens such that parallel light path enters said input end of said fiber optic bundle, and
   said output end of said fiber optic bundle being oriented so as to present at a desired location an image transmitted by said fiber optic bundle from said input end, said output end being arranged for direct viewing by an observer.

2. A vehicle including at least one of said fiber optic viewing devices as in claim 1.

3. A vehicle as in claim 2 in which said at least one said fiber optic viewing device comprises only two fiber optic viewing devices, each having a 90° field of vision.

4. A vehicle as in claim 2 in which said two fiber optic viewing devices have said input ends mounted near upper rear corners of said vehicle.

5. A vehicle as in claim 4 in which the normal to the principal plane of said at least one lens is directed to make an angle of at least ten degrees with a horizontal plane.

6. A vehicle as in claim 4 in which the normal to the principal plane of said at least one lens is directed to make an angle of about forty degrees from a vertical plane running from front to back through the center of the vehicle, the normal toward its respective one of the rear corners of said vehicle.

7. A vehicle as in claim 4 in which said lenses include means for shielding said lenses from above.

8. A vehicle as in claim 4 in which said two fiber optic viewing devices have their output ends mounted so as to be viewable by a driver of said vehicle.

9. A vehicle as in claim 8 in which said output ends are mounted side by side.

10. A vehicle as in claim 9 in which said output ends are mounted on a dash board of said vehicle.

11. A vehicle as in claim 9 in which said output ends are mounted in a dash board of said vehicle.

12. A vehicle as in claim 9 in which said output ends are mounted near the top of a windshield of said vehicle.

13. An aircraft further including at least one said fiber optic viewing device as in claim 1.

14. An aircraft as in claim 13 in which said at least one said fiber optic viewing device comprises four fiber optic viewing devices.

15. An aircraft as in claim 14 in which two of said four fiber optic viewing devices have their input ends mounted near two rear corners of said aircraft, one on the top of said aircraft and one on the bottom of said aircraft.

16. An aircraft as in claim 15 in which said output ends are mounted so as to be viewable by a pilot of said aircraft.

17. A security system including at least one said fiber optic viewing device as in claim 1.

18. A security system including a plurality of fiber optic viewing devices as in claim 1.

19. A security system as in claim 18 in which output ends of said plurality of fiber optic viewing devices are scanned by at least one television camera which in turn provide video signals to at least one television screen.

20. A security system as in claim 19 in which said plurality of fiber optic viewing devices are scanned by a plurality of television cameras which in turn provide video signals to a plurality of corresponding television screens.

21. A security system as in claim 19 in which said plurality of fiber optic viewing devices and said at least one television camera are located above a false ceiling in a building where said security system is located.

22. A nuclear power plant including at least one said fiber optic viewing device as in claim 1.

23. A nuclear power plant as in claim 22 in which said at least one fiber optic viewing device comprises multiple fiber optic viewing devices having their input ends mounted to view locations in said nuclear power plant which require inspection.

24. A clean room including at least one said fiber optic viewing device as in claim 1.

25. A clean room as in claim 24 in which said at least one fiber optic viewing device comprises multiple fiber optic viewing devices having their input ends mounted to view locations in said clean room which require inspection.

* * * * *